(12) United States Patent
Lee et al.

(10) Patent No.: US 10,819,381 B2
(45) Date of Patent: Oct. 27, 2020

(54) ELECTRONIC DEVICE INCLUDING GLASS PLATE

(71) Applicant: Samsung Electronics Co., Ltd., Gyeonggi-do (KR)

(72) Inventors: Sangbong Lee, Gyeonggi-do (KR); Namhyung Kim, Gyeonggi-do (KR); Taekon Kim, Gyeonggi-do (KR); Kiyul Lim, Gyeonggi-do (KR); Jaehoon Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/449,765

(22) Filed: Jun. 24, 2019

(65) Prior Publication Data
US 2020/0014415 A1    Jan. 9, 2020

(30) Foreign Application Priority Data
Jul. 9, 2018   (KR) .................. 10-2018-0079313

(51) Int. Cl.
*G06F 3/02*      (2006.01)
*H04B 1/3888*    (2015.01)
(Continued)

(52) U.S. Cl.
CPC ......... *H04B 1/3888* (2013.01); *G06F 1/1637* (2013.01); *G06F 1/1656* (2013.01); *H04M 1/0266* (2013.01)

(58) Field of Classification Search
CPC ........ G06F 1/16; G06F 1/1626; G06F 1/1637; G06F 1/1655; G02F 1/1333;
(Continued)

(56) References Cited

U.S. PATENT DOCUMENTS

2005/0090075 A1*  4/2005  Takayama ........... H01L 27/1214
                                                         438/455
2009/0207374 A1   8/2009  Ho et al.
(Continued)

FOREIGN PATENT DOCUMENTS

JP      2018-60081 A      4/2018
KR  10-2017-0033556 A     3/2017
(Continued)

OTHER PUBLICATIONS

International Search Report dated Sep. 24, 2019.

*Primary Examiner* — Joe H Cheng
(74) *Attorney, Agent, or Firm* — Cha & Reiter, LLC

(57) ABSTRACT

An electronic device according to certain embodiments includes a housing, a first glass plate coupled to the housing and defining an inner space, the first glass plate including a peripheral portion including: a first, second, third, fourth, and fifth surface forming an edge of the glass plate, the first and fifth surfaces being substantially parallel and the third surface being substantially perpendicular to the first and fifth surfaces, a decorative layer formed of a first material, disposed on a first area of the fifth surface such that a second area disposed between the fourth surface and the first area is uncovered by the decorative layer, and a protective layer formed of a second material, covering the second surface, the third surface, the fourth surface, the second area of the fifth surface, and a part of the decorative layer.

20 Claims, 10 Drawing Sheets

(51) Int. Cl.
*H04M 1/02* (2006.01)
*G06F 1/16* (2006.01)

(58) Field of Classification Search
CPC .. G02F 1/133308; G02F 1/1337; G02F 1/135; G02F 2001/133331; G02F 2001/133388; H04M 1/02; H04M 1/0249; H04M 1/0266; H04M 1/0283; H04M 1/185; B29D 11/00865; Y10T 428/1041
See application file for complete search history.

(56) References Cited

U.S. PATENT DOCUMENTS

| | | | |
|---|---|---|---|
| 2012/0199625 A1* | 8/2012 | Qi | B28D 1/225 |
| | | | 225/2 |
| 2012/0329525 A1 | 12/2012 | Hashimoto et al. | |
| 2015/0049285 A1* | 2/2015 | Qian | G02B 6/002 |
| | | | 349/106 |
| 2015/0212626 A1* | 7/2015 | Kim | G06F 3/044 |
| | | | 345/174 |
| 2016/0255735 A1* | 9/2016 | Han | H05K 5/0086 |
| | | | 359/894 |
| 2016/0334896 A1* | 11/2016 | Koike | B32B 15/082 |
| 2017/0013731 A1* | 1/2017 | Lee | H05K 5/0017 |
| 2017/0069867 A1* | 3/2017 | Hirakata | H01L 51/52 |
| 2017/0276977 A1 | 9/2017 | Li et al. | |
| 2018/0081087 A1* | 3/2018 | Toyooka | B32B 27/12 |
| 2018/0196476 A1* | 7/2018 | Kang | H04B 1/3888 |

FOREIGN PATENT DOCUMENTS

| | | |
|---|---|---|
| KR | 10-2018-0031270 A | 3/2018 |
| WO | 2018/057652 A1 | 3/2018 |

\* cited by examiner

ELECTRONIC DEVICE INCLUDING GLASS PLATE

CROSS-REFERENCE TO RELATED APPLICATION(S)

This application is based on and claims priority under 35 U.S.C. 119 to Korean Patent Application No. 10-2018-0079313, filed on Jul. 9, 2018, in the Korean Intellectual Property Office, the disclosure of which is herein incorporated by reference in its entirety.

TECHNICAL FIELD

The present disclosure relates to an electronic device, and, more particularly, to an electronic device that includes a glass plate.

BACKGROUND

Due to the remarkable development of information communication technology and semiconductor technology, the distribution and usage of a diversity of electronic devices is rapidly increasing. In particular, modern electronic devices are increasingly compact and portable, such that users can easily communicate regardless of where they are situated.

The phrase "electronic device" may indicate devices that perform specific functions according to programs incorporated therein. Such devices can include electronic schedulers, portable multimedia players, mobile communication terminals, tablet PCs, any device capable of producing image/sound, desktop PCs, laptop PCs, vehicular navigation systems, and smart home appliances. The above-mentioned electronic devices may output, for example, information stored therein in the form of a sound and/or an image. As the degree of integration of electronic devices increases, and super-high-speed and large-capacity wireless communication grows in popularity, the operative capability of a single electronic device has only increased, allowing such devices to perform a variety of functions. A prominent example of this versatile device is the mobile communication terminal or "smartphone." The mobile communication terminal is capable of executing a vast diversity of functions, including entertainment (e.g., a game), multimedia (e.g., playing of music/video), communication (e.g., calls), security for electronic payments and mobile banking, schedule management, and e-wallet functions. Such functions are all integrated within the single electronic device, in addition to a communication function. Such electronic devices have now been miniaturized, so that the user can conveniently carry the electronic device and access this diverse functionality anywhere.

In accordance with this diversification in functionality, housings and/or display devices that covers electronic devices are evolving in utility, and may take various shapes and functions.

SUMMARY

According to certain embodiments, by coating the protective layer on the end areas of the glass plate, it is possible to suppress a phenomenon of leakage of light emitted from the display.

According to certain embodiments, a part of the protective layer coated on the end areas of the glass plate is formed to cover a part of a print layer or of a film layer of the display, so that it is possible to inhibit the torn-off phenomenon of the ends of the print layer or film layer.

According to certain embodiments, by coating a protective layer in the end areas of the glass plate that face the peripheral portion of the housing, it is possible to protect the glass plate that may hit the housing by an external impact.

An electronic device according to certain embodiments may include a housing, a first glass plate coupled to the housing and defining an inner space between the first glass plate and the housing, the first glass plate including a peripheral portion disposed adjacent to the housing, wherein the peripheral portion includes, a first surface facing away from the inner space, a second surface extending from an end of the first surface and set at a first angle relative to a plane of the first surface, a third surface extending from an end of the second surface set at a second angle relative to a plane of the second surface, a fourth surface extending from an end of the third surface set at a third angle relative to a plane of the third surface, and a fifth surface extending from the fourth surface, substantially parallel to the first surface and facing the inner space, the fifth surface including a curvature, a decorative layer formed of a first material, disposed on a first area of the fifth surface such that a second area disposed between the fourth surface and the first area is uncovered by the decorative layer, and a protective layer formed of a second material, covering the second surface, the third surface, the fourth surface, the second area of the fifth surface, and a part of the decorative layer.

An electronic device according to certain embodiments may include a housing, a first glass plate coupled to the housing as to define an inner space between the first glass plate and the housing, the first glass plate including a peripheral portion disposed adjacent to the housing, wherein the peripheral portion includes: a first surface facing away from the inner space, a second surface extending from an end of the first surface and set at a first angle relative to a plane of the first surface, a third surface extending from an end of the second surface and set at a second angle relative to a plane of the second surface, a fourth surface extending from an end of the third surface and set at a third angle relative to a plane of the third surface, a fifth surface extending from the fourth surface substantially parallel to the first surface and facing the inner space, the fifth surface including a curvature, a decorative layer disposed on a first area of the fifth surface such that a second area disposed between the fourth surface and the first area is uncovered by the decorative layer, and a protective layer covering the second surface, the third surface, the fourth surface, a second area of the fifth surface, and a part of the decorative layer.

An electronic device according to certain embodiments may include: a first glass plate including a flat portion and a curved portion forming an end of the first glass plate, wherein the curved portion include, a first surface facing an exterior of the electronic device, a second surface extending from an end of the first surface and set at a first angle relative to a plane of the first surface, a third surface extending from an end of the second surface and set at a second angle relative to a plane of the second surface, the third surface forming a part of a side face of the electronic device, a fourth surface extending from an end of the third surface and set at a third angle relative to a plane of the third surface, a fifth surface extending from an end of the fourth surface, the first surface substantially parallel to the first surface and facing an interior of the electronic device, a decorative layer disposed on at least a partial area of the fifth surface included in the curved portion of the first glass plate, and a protective layer covering the second surface, the third surface, the fourth surface, and the fifth surface of the first glass plate, and further laminated over a part of the decorative layer.

According to certain embodiments, by coating the protective layer in the end areas of the glass plate, it is possible to prevent a phenomenon of leakage of light emitted from the display.

According to certain embodiments, by coating the protective layer in the end areas of the glass plate, it is possible to improve the strength of the glass plate and to improve Color Material Finishing (CMF) quality.

According to certain embodiments, a part of the protective layer coated in the end areas of the glass plate is formed to cover the ends of the print layer or the film layer of the display, so that it is possible to prevent the torn-off phenomenon of the ends of the print layer or film layer.

BRIEF DESCRIPTION OF THE DRAWINGS

The above and other aspects, features, and advantages of the disclosure will be more apparent from the following detailed description taken in conjunction with the accompanying drawings, in which.

DETAILED DESCRIPTION

In accordance with this diversification in functionality, housings and/or display devices that cover electronic devices are evolving in utility, and may take various shapes and functions. For example, electronic devices may be equipped with a front cover covering a display or a rear cover covering the rear face of an electronic device. Such devices may implement a structure extending to a side portion of the electronic device, thereby providing the capability to expand the internal mounting space, in addition to providing improved aesthetics more pleasing to a user.

In curved-edge displays, the curvature of the glass plate covering the front face and/or the rear face of the electronic device may result in light leakage may occur from the ends of the glass plate. For example, since the left and right edges of the glass plate form curved portions which are bent downwards or inwards, light emitted from the display may be totally reflected in the glass plate, and a light leakage phenomenon may occur at the opposite edges of the glass plate, of which the end portion is exposed to an exterior of the device.

Accordingly, the curved portions of the glass plate covering the front face and/or the rear face of the electronic device make it difficult to form a print layer, and a tear-off phenomenon is possible, in which the ends of the print layer are easily damaged during additional processing during manufacture, after forming the print layer. In another example, since the curved portion of the glass plate is oriented to face the peripheral portion of the housing with a gap therebetween, the glass is at risk of striking the housing, which may be formed a metal material while high material strength when an external impact is applied thereto, which can easily damage the glass plate.

Figure 1:
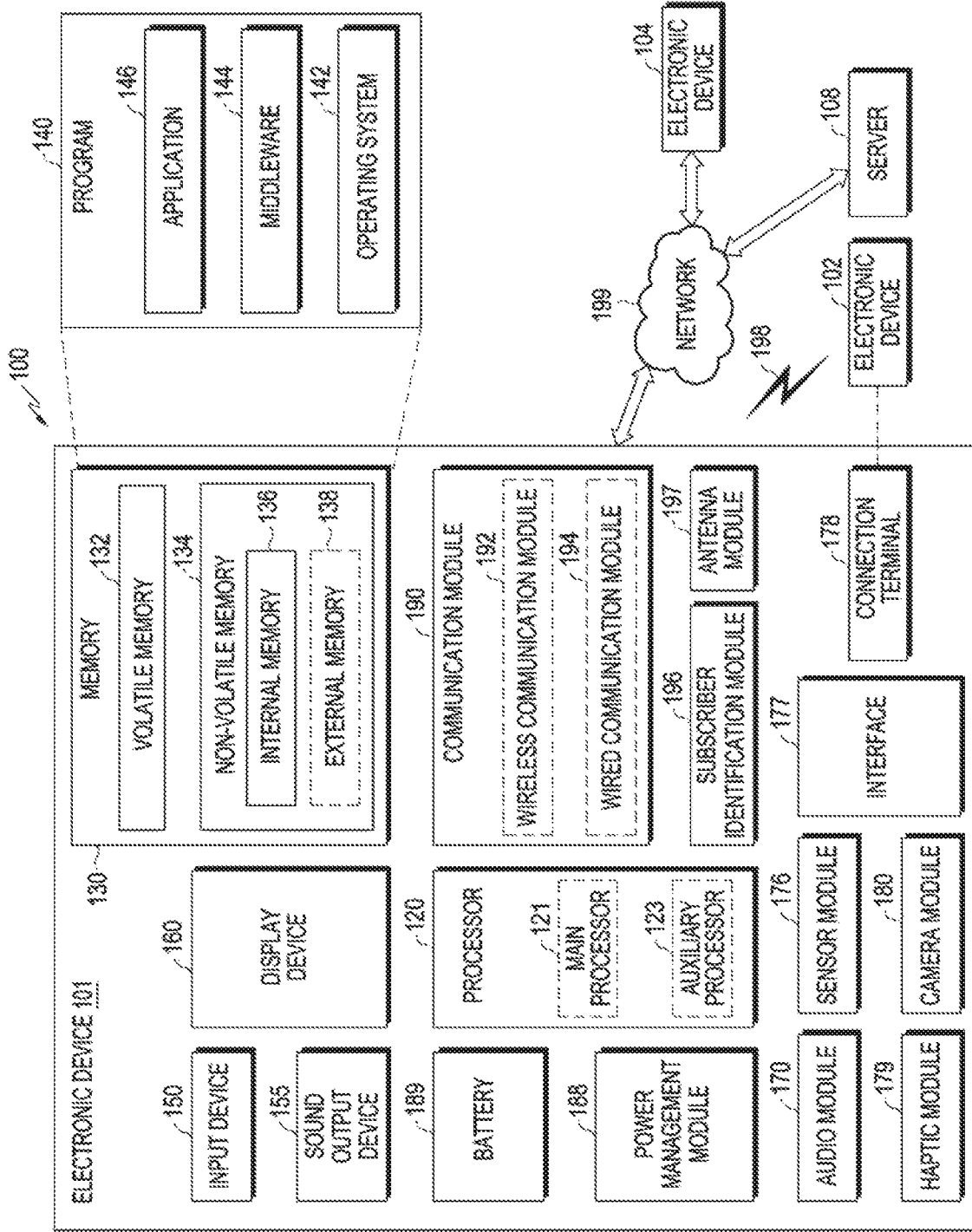
FIG. 1 is a block diagram of an electronic device according to certain embodiments in a network environment.

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module (or modules) 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199

(e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
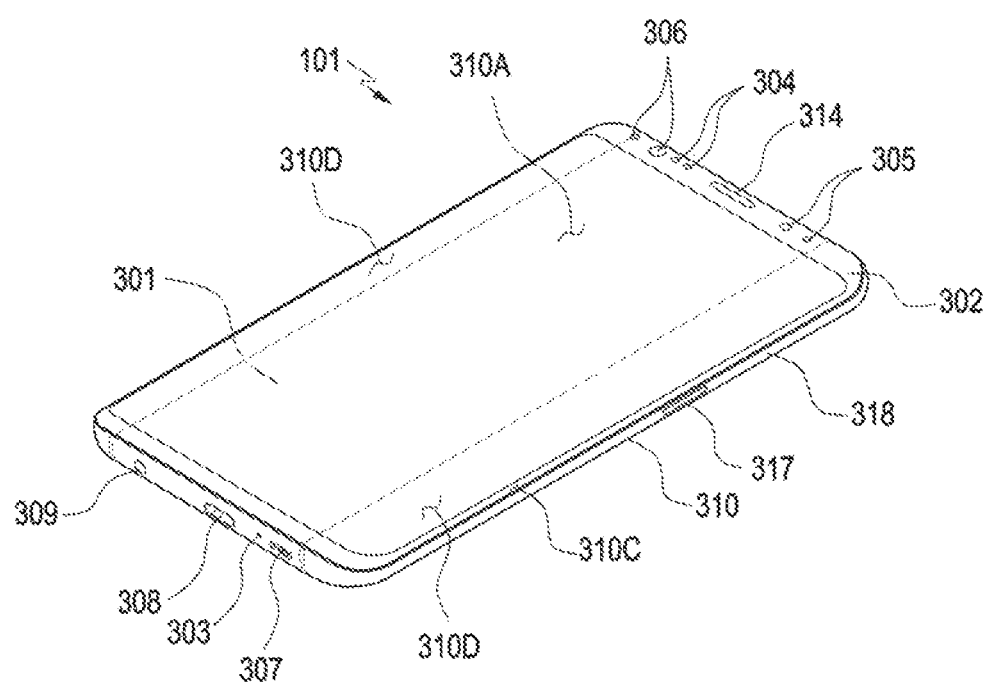
FIG. 2 is a front side perspective view illustrating an electronic device according to certain embodiments.
Figure 3:
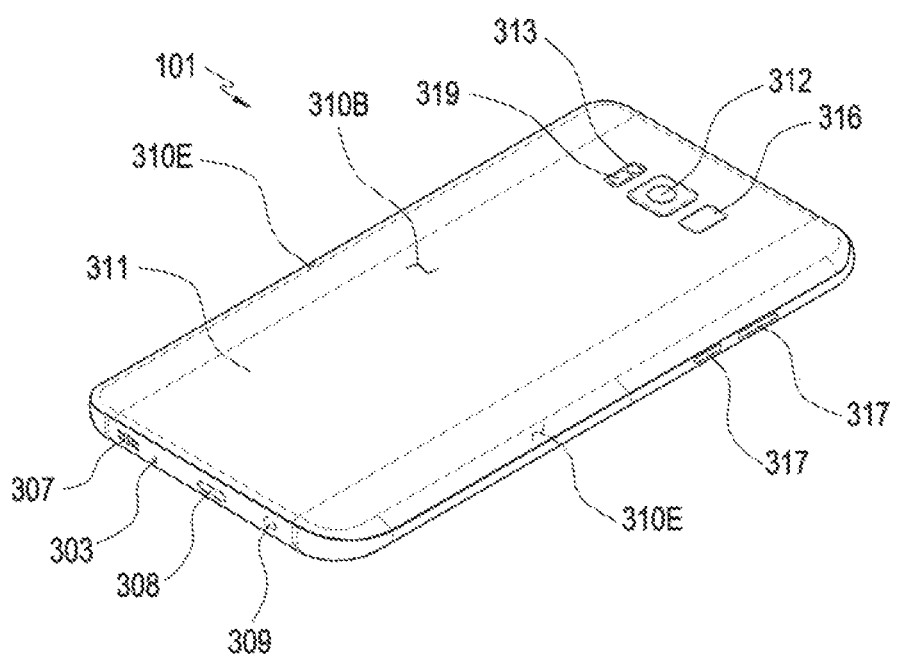
FIG. 3 is a rear side perspective view illustrating the electronic device according to certain embodiments of the disclosure.

FIG. 2 is a front perspective view illustrating a front face of an electronic device 101 according to certain embodiments. FIG. 3 is a rear perspective view illustrating a rear face of the electronic device 101 according to certain embodiments.

Referring to FIGS. 2 and 3, the electronic device 101 according to an embodiment may include a housing 310 including a first face (or a front face) 310A, a second face (or a rear face) 310B, and side faces 310C surrounding a space defined between the first face 310A and the second face 310B. In another embodiment (which is not illustrated), the term "housing" may refer to a structure forming a part of the first face 310A, the second face 310B, and the side faces 310C of FIG. 2. According to an embodiment, at least a part of the first face 310A may be formed of a substantially transparent front plate 302 (e.g., a glass plate or a polymer plate). The second face 310B may be formed of a substantially opaque rear plate 311. The rear plate 311 may be formed of, for example, coated or colored glass, ceramic, a polymer, or a metal (e.g., aluminum, stainless steel (STS), or magnesium), or a combination of two or more of these materials. The side faces 310C may be formed to include a side bezel structure (or a side member) 318 coupled to the front plate 302 and the rear plate 311 and including a metal and/or a polymer. In some embodiments, the rear plate 311 and the side bezel structure 318 may be integrally formed, and of the same material (e.g., a metal material such as aluminum).

In the illustrated embodiment, the front plate 302 may include two first areas 310D, disposed along the long edges of the front plate 302. The first two areas 310D may include a bend (or slope) downwards from the first face 310A and towards the rear plate 311, extending seamlessly thereof. In the illustrated embodiment (see FIG. 3), the rear plate 311 may include, at the long opposite side edges thereof, two second areas 310E, which are bent from the second face 310B toward the front plate 302 and extend seamlessly. In some embodiments, the front plate 302 (or the rear plate 311) may include one of the first areas 310D and the second areas 310E (e.g., meaning there is no curvature at the edge of the display). In another embodiment, some of the first areas 310D and the second areas 310E may not be included. In the above embodiments, when viewed from a side of the electronic device 101, the side bezel structure 318 may include a first thickness (or width) on the side faces, which do not include the first areas 310D or the second areas 310E, and may have a second thickness, which is thinner than the first thickness, on the side faces which include the first areas 310D or the second areas 310E.

According to an embodiment, the electronic device 101 may include at least one of a display 301, audio modules 170 (from FIG. 1), sensor modules 304, 316, and 319, camera modules 305, 312, and 313, key input devices 317, light-emitting elements 306, and connector holes 308 and 309. In some embodiments, at least one of the components (e.g., the key input devices 317 or the light-emitting elements 306) may be omitted from the electronic device 101, or the electronic device 101 may additionally include other components.

According to an embodiment, the display 301 may be visually exposed through a large portion of, for example, the front plate 302. In some embodiments, at least a part of the display 301 may be exposed through the front plate 302 forming the first face 310A and the first areas 310D of the side faces 310C. In some embodiments, the edges of the display 301 may be formed to be substantially the same as the contour shape of the front plate 302 adjacent thereto. In another embodiment (not illustrated), the distance between the outer contour of the display 301 and the outer contour of the front plate 302 may be substantially constant in order to enlarge the exposed area of the display 301.

In another embodiment (not illustrated), a recess or an opening is disposed in a part of a screen display area of the display 301, and at least one of the audio module 314, the sensor module 304, the camera module 305, and the light-emitting element 306 may be aligned with the recess or the opening. In another embodiment (not illustrated), at least one of the audio module 314, the sensor module 304, the camera module 305, the fingerprint sensor 316, and the light-emitting element 306 may be included in the rear face of the screen display area of the display 301. In another embodiment (not illustrated), the display 301 may be coupled to or disposed adjacent to a touch-sensing circuit, a pressure sensor capable of measuring the intensity of the touch (pressure), and/or a digitizer that detects a magnetic field type stylus pen. In some embodiments, at least some of the sensor modules 304 and 519 and/or at least some of the key input devices 317 may be disposed in the first areas 310D and/or the second areas 310E.

According to an embodiment, the audio modules 170 disposed in holes 303, 307, and 314 may include a microphone hole 303 and speaker holes 307 and 314. The microphone hole 303 may include a microphone disposed therein so as to acquire external sound, and in some embodiments, a plurality of microphones may be disposed therein so as to detect the direction of the sound. The speaker holes 307 and 314 may include an external speaker hole 307 and a phone call receiver hole 314. In some embodiments, the speaker holes 307 and 314 and the microphone hole 303 may be implemented as a single hole, or a speaker may be included without the speaker holes 307 and 314 (e.g., a piezo speaker). The audio modules 170 disposed in the holes 303, 307, and 314 are not limited to utilizing the above-described structure, and may be variously changed in design depending on the structure of the electronic device 101, for example, by mounting some of the audio modules or by adding new audio modules.

According to an embodiment, the sensor modules 304, 316, and 319 may generate an electrical signal or a data value corresponding to, for example, the internal operating conditions or the external environmental conditions of the electronic device 101. The sensor modules 304, 316, and 319 may include, for example, a first sensor module 304 (e.g., a proximity sensor) and/or a second sensor module (not illustrated) (e.g., a fingerprint sensor) disposed on the first face 310A of the housing 310, and/or a third sensor module 319 (e.g., an HRM sensor) and/or a fourth sensor module 316 (e.g., a fingerprint sensor) disposed on the second face 310B of the housing 310. The fingerprint sensor may be disposed not only on the first face 310A of the housing 310 (e.g., the display 301), but also on the second face 310B. The electronic device 101 may further include at least one of sensor modules (not illustrated) such as a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, and an illuminance sensor. The sensor modules 304, 316, and 319 are not limited to the above-described structure, and may be variously changed in design depending on the structure of the electronic device 101, for example, by mounting some of the sensor modules or by adding new sensor modules.

According to an embodiment, the camera modules 305, 312, and 313 may include, for example, a first camera device 305 disposed on the first face 310A of the electronic device 101, and a second camera device 312 and/or a flash 313 disposed on the second face 310B. The camera modules 305 and 312 may include one or more lenses, an image sensor, and/or an image signal processor. The flash 313 may include, for example, a light-emitting diode or a xenon lamp. In some embodiments, two or more lenses (e.g., an infrared camera lens, a wide-angle lens, and a telephoto lens) and image sensors may be disposed on one face of the electronic device 101. The camera modules 305, 312, and 313 are not limited to the above-described structure, and may be variously changed in design depending on the structure of the electronic device 101, for example, by mounting some of the camera modules or by adding new camera modules.

According to an embodiment, the key input devices 317 may be disposed on the side faces 310C of the housing 310. In another embodiment, the electronic device 101 may not include some or all of the above-mentioned key input devices 317, and a key input device 317, which is not included therein, may be implemented in another form such as a soft key on the display 301. In some embodiments, the key input devices may include a sensor module 316 disposed on the second face 310B of the housing 310.

According to an embodiment, the light-emitting element 306 may be disposed on, for example, the first face 310A of the housing 310. The light-emitting element 306 may provide, for example, status information of the electronic device 101 in an optical form. In another embodiment, the light-emitting element 306 may provide a light source that is interlocked with, for example, the operation of the camera module 305. The light-emitting element 306 may include, for example, an LED, an IR LED, and a xenon lamp.

According to an embodiment, the connector holes 308 and 309 may include, for example, a first connector hole 308 capable of accommodating a connector (e.g., a USB connector) for transmitting/receiving power and/or data to/from an external electronic device, and/or a second connector hole 309 capable of accommodating a connector (e.g., an earphone jack) for transmitting/receiving an audio signal to/from an external electronic device. The connector holes 308 and 309 are not limited to the above-described structure, and may be variously changed in design depending on the structure of the electronic device 101, for example, by providing some of the connector holes or by adding new connector holes.

Figure 4:
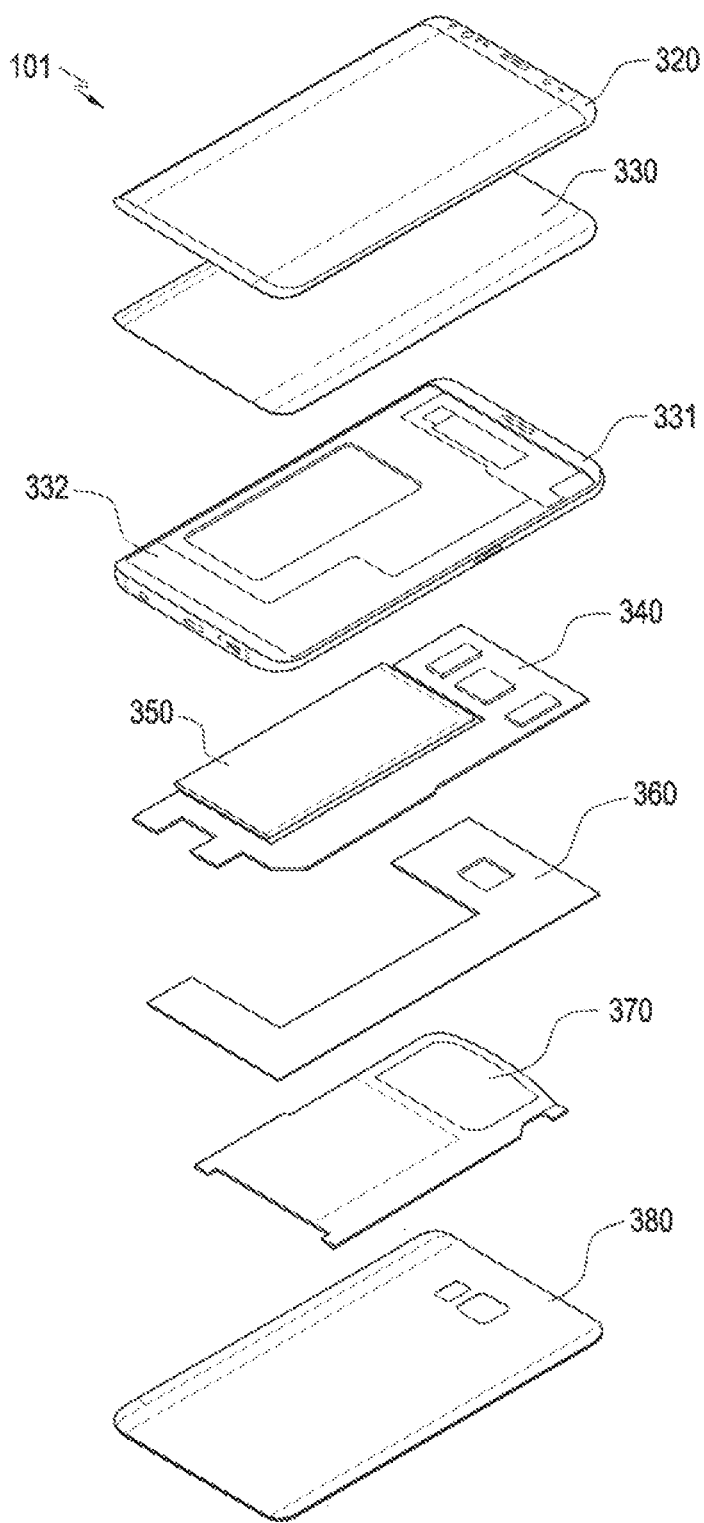
FIG. 4 is an exploded perspective view illustrating an electronic device according to certain embodiments.

FIG. 4 is an exploded perspective view illustrating the electronic device 101 according to certain embodiments.

Referring to FIG. 4, the electronic device 101 according to certain embodiments (e.g., the electronic device 101 in FIGS. 1 to 3) may include a side bezel structure 331, a first support member 332 (e.g., a bracket), a front plate 320, a display 330, a printed circuit board 340, a battery 350, a second support member 360 (e.g., a rear case), an antenna 370, and a rear plate 380. In some embodiments, at least one of the components (e.g., the first support member 332 or the second support member 360) may be omitted from the electronic device 101, or the electronic device 101 may additionally include other components. At least one of the components of the electronic device 101 may be the same as or similar to at least one of the components of the electronic device 101 of FIG. 2 or 3, and a redundant description thereof is omitted below.

According to certain embodiments, the first support member 332 may be disposed inside the electronic device 101, and the first support member 332 may be connected to the side bezel structure 331, or may be integrally formed with the side bezel structure 331. The first support member 332 may be formed of, for example, a metal material and/or a non-metal (e.g., polymer) material. The display 330 may be coupled to one face of the first support member 332, and the printed circuit board 340 may be coupled to the other face of the first support member 332. On the printed circuit board 340, a processor, a memory, and/or an interface may be mounted. The processor may include at least one of, for example, a central processing unit, an application processor, a graphic processor, an image signal processor, a sensor hub processor, or a communication processor.

According to certain embodiments, the memory may include, for example, volatile memory or nonvolatile memory.

According to certain embodiments, the interface may include, for example, a High-Definition Multimedia Interface (HDMI), a Universal Serial Bus (USB) interface, an SD card interface, and/or an audio interface. The interface may electrically or physically connect, for example, the electronic device 101 to an external electronic device, and may include a USB connector, an SD card, an MMC connector, or an audio connector.

According to certain embodiments, the battery 350 is a device for supplying power to at least one component of the electronic device 101, and may include, for example, a non-rechargeable primary battery, a rechargeable secondary battery, or a fuel cell. At least a part of the battery 350 may be disposed to be substantially flush with, for example, the printed circuit board 340. The battery 350 may be integrally disposed within the electronic device 101, or may be mounted to be detachable from the electronic device 101.

According to certain embodiments, the antenna 370 may be disposed between the rear plate 380 and the battery 350. The antenna 370 may include, for example, a Near-Field Communication (NFC) antenna, a wireless charging antenna, and/or a Magnetic Secure Transmission (MST) antenna. The antenna 370 may perform short-range communication with, for example, an external device, or may transmit/receive power utilized for charging in a wireless manner to/from the external device. In another embodiment, an antenna structure may be formed by the side bezel structure 331, a part of the first support member 332, or a combination thereof.

Figure 5A:
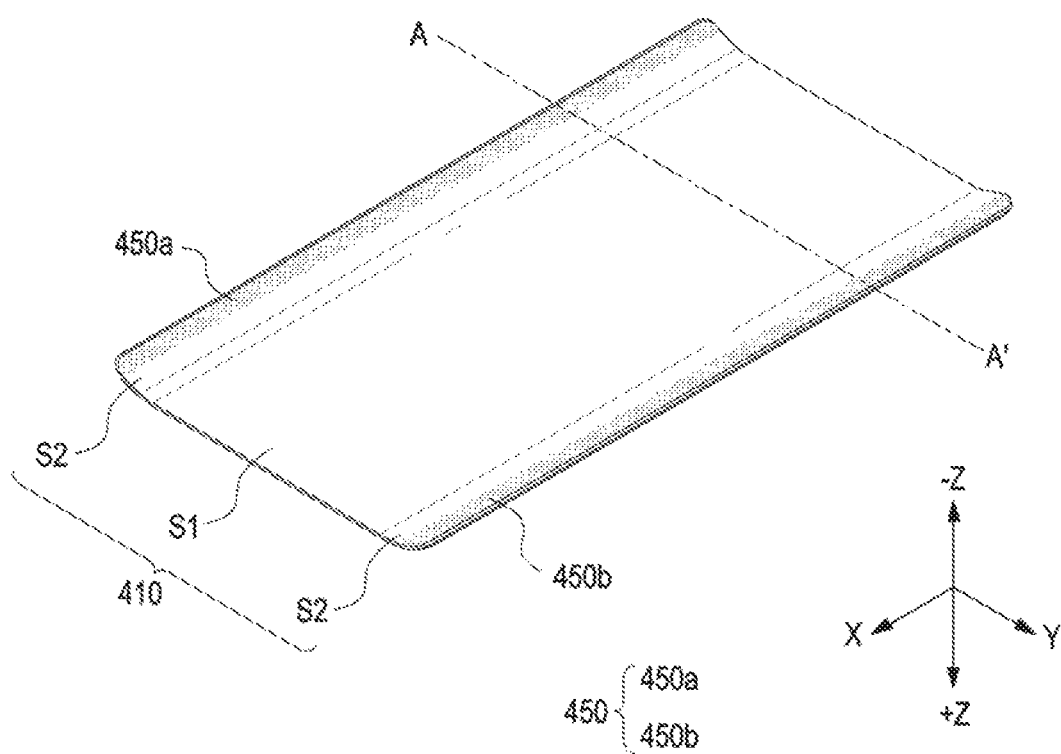
FIG. 5A is a perspective view illustrating a glass plate of an electronic device according to certain embodiments and a protective layer disposed on at least a part of the glass plate.
Figure 5B:
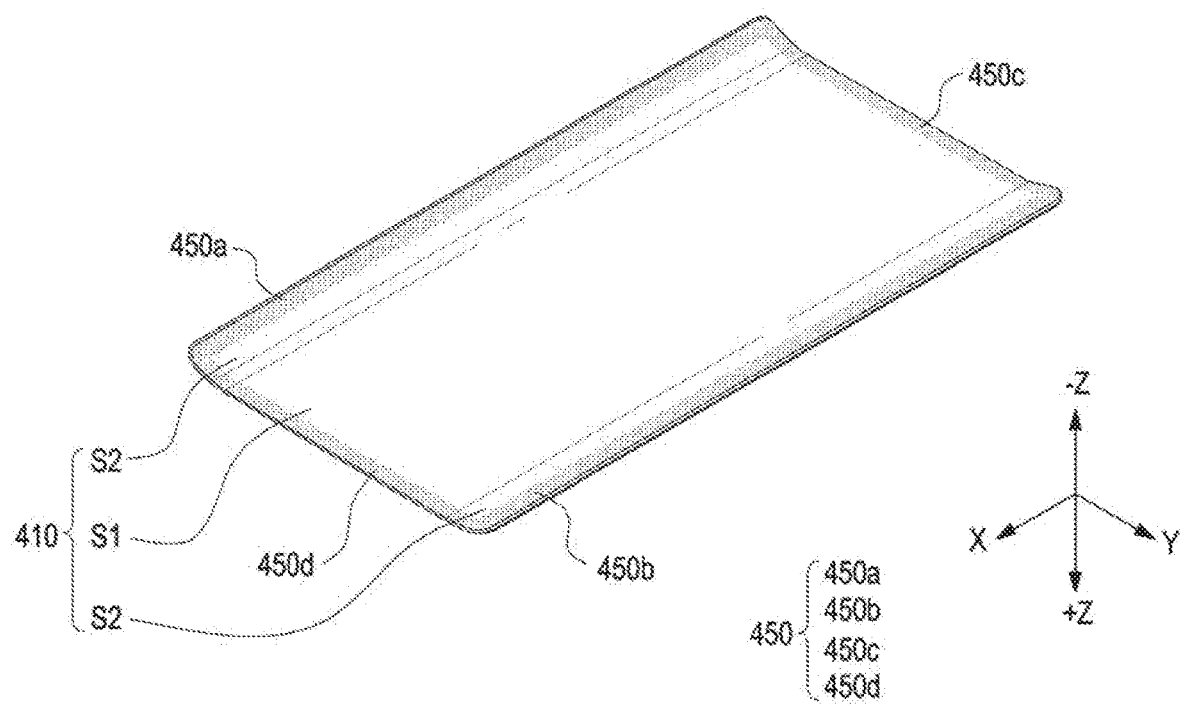
FIG. 5B is a perspective view illustrating a glass plate of an electronic device according to another embodiment and a protective layer disposed on at least a part of the glass plate.
Figure 5C:
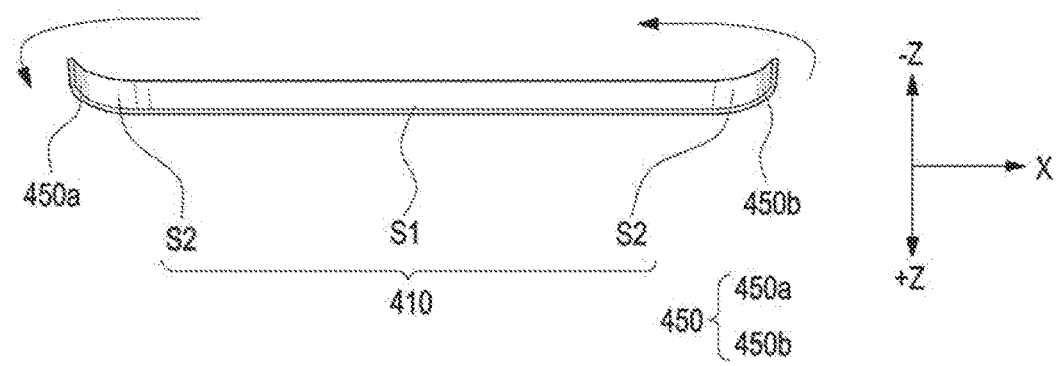
FIG. 5C is a perspective view illustrating a cross section of the glass plate of FIG. 5A taken along the line A-A' in FIG. 5A.

FIG. 5A is a perspective view illustrating a glass plate of an electronic device according to certain embodiments and a protective layer disposed on at least a part of the glass plate. FIG. 5B is a perspective view illustrating a glass plate of an electronic device according to another embodiment of the disclosure and a protective layer disposed on at least a part of the glass plate. FIG. 5C is a perspective view illustrating a cross section of the glass plate of FIG. 5A taken along the line A-A' in FIG. 5A.

In FIGS. 5A and 5B, "X" in the tri-axial orthogonal coordinate system may mean a lengthwise direction of the glass plate, "Y" may mean a widthwise direction of the glass plate, and "Z" may mean a vertical (e.g., thickness) direction of the glass plate. In addition, in an embodiment of the disclosure, "Z" may mean the forward direction (+Z) and the rearward direction (−Z).

According to certain embodiments, an electronic device (e.g., the electronic device 101 in FIGS. 1 to 4) may include a glass plate 410 (e.g., the first glass plate or the second glass plate), and a protective layer 450. According to an embodiment, the glass plate 410 of FIGS. 5A to 5C may be partially or wholly the same as the configuration of the front plate 320 of FIG. 4, and the glass plate 410 of FIGS. 5A to 5C may be partially or wholly the same as the configuration of the rear plate 380 of FIG. 4.

Referring to FIGS. 5A to 5C, the glass plate 410 of the electronic device 101 may cover the front or rear face of the electronic device 101, and at least a part thereof may be made of a transparent glass material. At least a part of the glass plate 410 may include a curved surface (e.g., 2.5D or 3D). For example, the glass plate 410 may include a flat portion S1 and curved portions S2 forming curved faces extending from the flat portion S1. The flat portion S1 may be a central area of the glass plate 410, and the curved portions S2 may be a part of end areas of the glass plate 410. The curved portions S2 have curved structures which are seamlessly bent in the rearward direction (−Z), and may be arranged in longitudinal edge areas of the glass plate 410.

According to an embodiment, the curved portions S2 may be formed in the edge areas of the glass plate 410 with the flat portion S1 as the center. For example, the curved portions S2 includes a first curved portion S2 and a second curved portion S2, and the first curved portion S2 and the second curved portion S2 may be formed at opposite longitudinal edges extending in the X-axis direction of the first glass plate 410 and may not be formed at opposite widthwise edges extending in the Y-axis direction.

According to certain embodiments, a protective layer 450 may be disposed on at least a part of the curved portions S2 of the glass plate 410. The protective layer 450 may be formed as to surround at least a part of the side face and/or at least a part of the inner face (e.g., in the rearward direction (−Z)) of each curved portion S2. The protective layer 450 may include a second material, which may be produced using a one-part or two-part curable material, such as acrylic melamine, modified acrylic, or modified epoxy, or a combination of two or more thereof.

According to an embodiment, the protective layer 450 may be disposed at the opposite ends of the glass plate 410 to provide prevention of light leakage and improve impact resistance in the opposite end areas S2 of the glass plate 410. For example, referring to FIG. 5A, the protective layer 450 may include a first protective layer 450a and a second protective layer 450b. The first protective layer 450a may be coated on at least one face of the first curved portion S2. As another example, the second protective layer 450b may be coated on at least one face of the second curved portion S2. According to an embodiment, the first protective layer 450a and the second protective layer 450b may have the same thickness and length as one other.

As another example, referring to FIG. 5B, the protective layer 450 may include a first protective layer 450a, a second protective layer 450b, a third protective layer 450c, and a fourth protective layer 450d. The first protective layer 450a may be coated on at least one face of the first curved portion S2, and the second protective layer 450b may be coated on at least one face of the second curved portion S2. The third protective layer 450c and the fourth protective layer 450d may be coated respectively on the shorter top and bottom edges of the first glass plate 410 (e.g., the terminal ends of the first glass plate according to the widthwise direction Y). The first protective layer 450a, the second protective layer 450b, the third protective layer 450c, and the fourth protective layer 450d may be connected to each other, so that all of the edge areas of the glass plate 410 may be coated with the protective layer 450.

According to certain embodiments, at least a part of each of the curved portions S2 of the glass plate 610 on which the protective layer 450 is formed has a curved shape, and may be provided as a combination of a curved shape in one portion and a flat shape in another portion. As another example, it has been described that the protective layer 450 is disposed on the curved portions S2 of the glass plate 410, as illustrated in FIGS. 5A and 5B. However, the disclosure is not limited thereto, and when an end portion of the glass plate are produced as a flat face, the protective layer may be disposed on at least a part of the side face and/or the inward face of the end portion of the glass plate.

Figure 6:
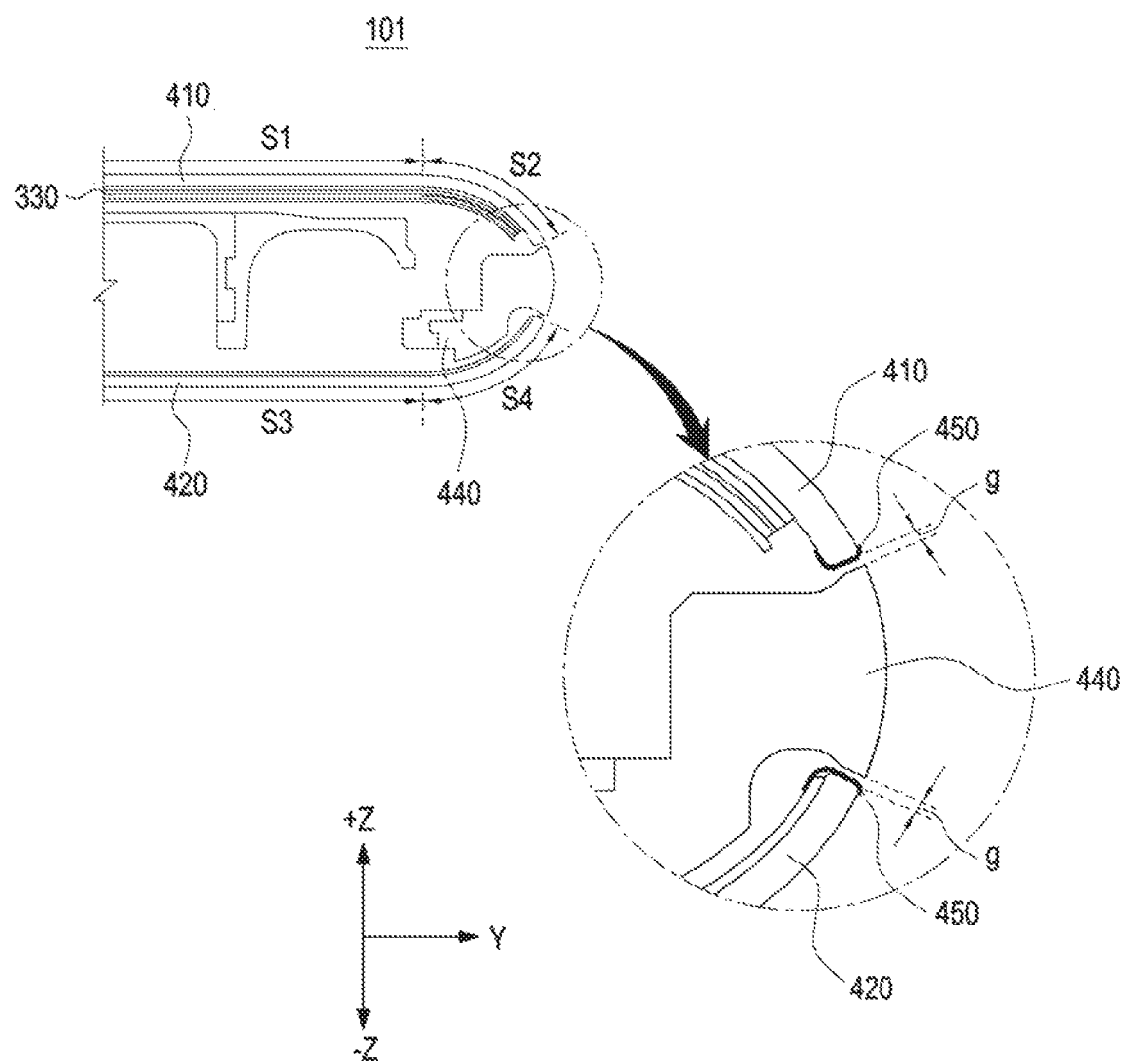
FIG. 6 is a cross-sectional view illustrating an arrangement relationship between coated areas of glass plates of an electronic device and a bracket.

FIG. 6 is a cross-sectional view illustrating an arrangement relationship between coated areas of glass plates of an electronic device and a bracket.

In FIG. 6, "Y" in a 2-axis orthogonal coordinate system may represent a widthwise direction of an electronic device 10, and "Z" may represent a vertical (e.g., the thickness) direction of the electronic device 10. In an embodiment of the disclosure, "Z" may include a first direction (+Z) or a second direction (−Z).

According to certain embodiments, the electronic device 101 may include a bracket 440 (e.g., the first support member 332 in FIG. 4), a first glass plate 410, a second glass plate 420, a display 330, and a protective layer 450. The configuration of the bracket 440, the first glass plate 410, the second glass plate 420 and the display 330 of FIG. 6 is partially or wholly the same as that of the support member 332, the front plate 320, the rear plate 380, and the display 330 of FIG. 4.

According to certain embodiments, the bracket 440 is a part of a housing (e.g., the housing 310 in FIGS. 2 and 3), which may support the electronic device 101 as a whole or may provide a space in which electronic components can be mounted.

According to certain embodiments, the first glass plate 410 is disposed in the vertical direction (i.e., the +Z direction or towards a front of the device) of the bracket 440, and the second glass plate 420 is disposed in the downward direction of the bracket 440 (i.e., the −Z direction or towards a rear of the device). The first glass plate 410 may be attached to the housing (e.g., front plate) 320 so as to define an inner space with the housing (e.g., the bracket 440), and may include a peripheral portion adjacent to the bracket 440. The peripheral portion of the first glass plate 410 may include the opposite long edges of the first glass plate 410. In an embodiment, the opposite edges of the first glass plate 410 and the second glass plate 420 may include curved surfaces. For example, the first glass plate 410 may include a flat portion S1 and a curved portion S2 extending from an edge of the flat portion S1. The second glass plate 420 may include a flat portion S3 and a curved portion S4 extending from an edge of the flat portion S3.

According to certain embodiments, the curved portion S2 of the first glass plate 410 may be formed in the opposite longitudinal edges of the first glass plate 410, and may seamlessly extend from the flat portion S1 slopping (e.g., bending) towards the second glass plate 420. As another example, the curved portion S4 of the second glass plate 420 may be formed in the opposite longitudinal edges of the second glass plate 420, and may seamlessly extend from the flat portion S3 sloping (e.g., bending) toward the first glass plate 410. The first glass plate 410 and the second glass plate 420 may be disposed to face at least a part of the bracket 440, due to the curvature of the curved portions S2 and S4.

According to certain embodiments, a protective layer 450 may be coated on at least a part of the curved portion S2 of the first glass plate 410 and/or a part of the curved portion S4 of the second glass plate 420. For example, the protective layer 450 coated on the first glass plate 410 may be formed to enclose at least a part of the inner face and/or a part of the side face of the first glass plate 410. At least a portion of the protective layer 450 formed on the side face may be disposed between the side face of the first glass plate 410 and the bracket 440, so that the impact applied to the bracket 440 from the first glass plate 410 can be alleviated. As another example, the protective layer 450 coated on the second glass plate 420 may be formed to enclose at least a part of the inner face and/or a part of the side face of the second glass plate 420. At least a portion of the protective layer 450 formed on the side face may be disposed between the side face of the second glass plate 420 and the bracket 440, so that the impact applied to the bracket 440 from the second glass plate 420 can be alleviated.

According to certain embodiments, a partial area of the curved portion S2 of the first glass plate 410 and/or a partial area of the curved portion S4 of the second glass plate 420 are disposed adjacent to the bracket 440 formed of a metal material, and a gap "g" may exist between the ends of each of the glass plates (the first glass plate 410 and/or the second glass plate 420) and the bracket 440. Previously, the gap "g" could close when an external impact is applied, so that the bracket 440 (formed of a metal having a large material strength) may directly strike the curved portion S2 or S4 of the plates (the first glass plate 410 and/or the second glass plate 420) of a glass material (e.g., which has a small material strength) and may impact the curved portion S2 or S4. Accordingly, a partial area of the curved portion S2 or S4 of the glass plates (the first glass plate 410 and/or the second glass plate 420) could be damaged in the impact. The protective layer 450 formed on the curved portion S2 or S4 of the glass plates (the first glass plate 410 and/or the second glass plate 420) may form a buffer area in the gap g and may protect the side face of the glass plate by absorbing any such shocks, thereby reducing the likelihood of damage due to the impact caused by the bracket 440.

Figure 7:
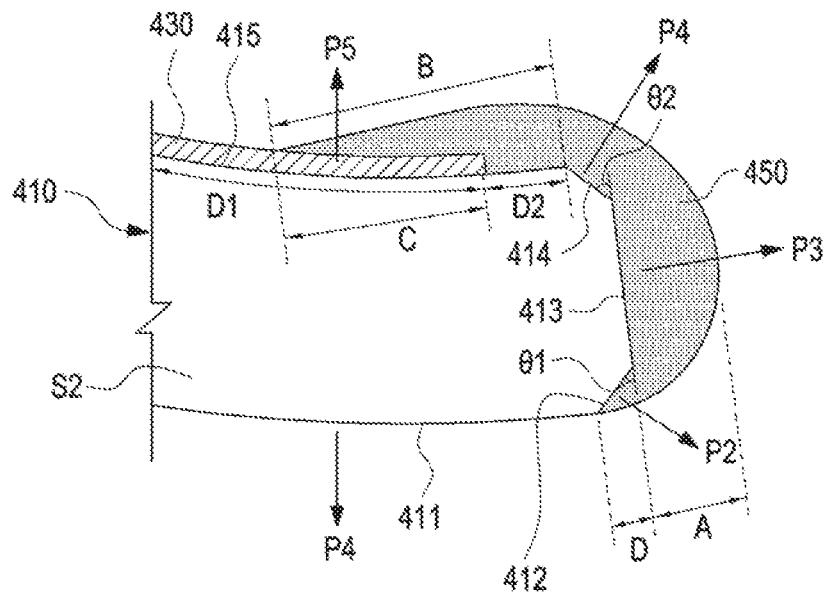
FIG. 7 is a cross-sectional view illustrating an arrangement relationship between a glass plate, a protective layer, and a decorative layer of an electronic device.
Figure 8:
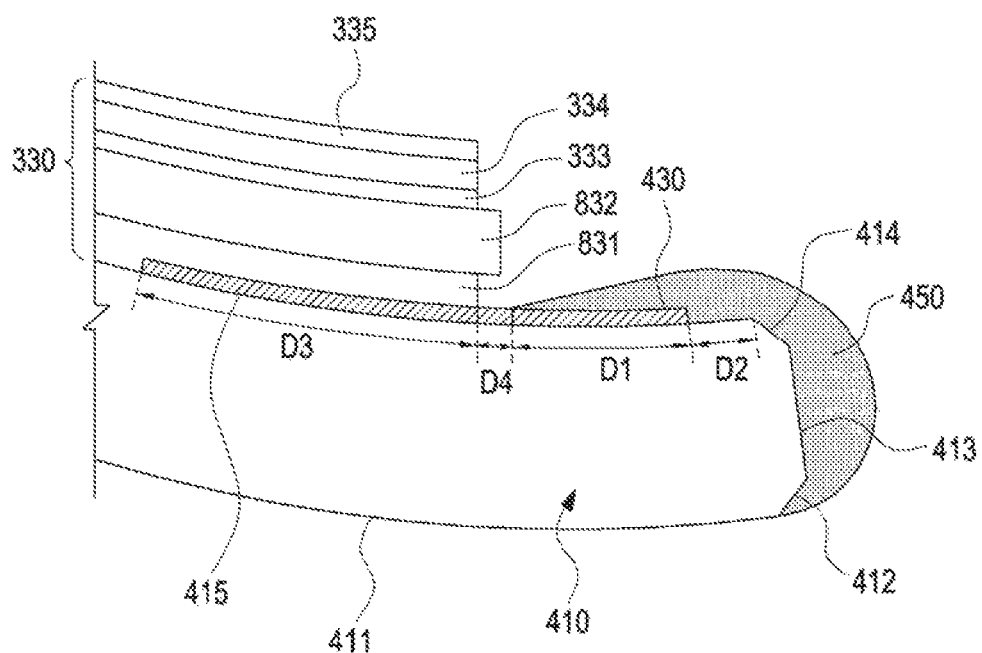
FIG. 8 is a cross-sectional view illustrating an arrangement relationship between a glass plate, a protective layer, a UV layer, and a decorative layer of an electronic device.

FIG. 7 is a cross-sectional view illustrating an arrangement relationship between a glass plate, a protective layer, and a decorative layer of an electronic device. FIG. 8 is a cross-sectional view illustrating an arrangement relationship between a glass plate, a protective layer, a UV layer, and a decorative layer of an electronic device.

Referring to FIGS. 7 and 8, an electronic device (e.g., the electronic device 101 in FIGS. 1 to 4) may include a housing (e.g., the housing 310 in FIGS. 2 and 3), a first glass plate 410, a decorative layer 430, and a protective layer 450. The first glass plate 410 of FIGS. 7 and 8 may be the front plate (e.g., the front plate 320 in FIG. 4) or the rear plate (e.g., the rear plate 380 in FIG. 4) of the electronic device 101.

According to certain embodiments, the first glass plate 410 may include a flat portion (e.g., the flat portion S1 in FIG. 5A) and a curved portion S2 extending from an edge of the flat portion S1. The decorating layer 430 and the protective layer 450 may be disposed on a part of the curved portion S2 of the first glass plate 410.

According to certain embodiments, the curved portion S2 of the first glass plate 410 may include a first surface 411 oriented in a first direction P1, a second surface 412 extending from the first surface 411 and oriented in a second direction P2, a third surface 413 extending from the second surface 412 and oriented in a third direction P3, a fourth surface 414 extending from the third surface 413 and oriented in a fourth direction P4, and a fifth surface 414 extending from the fourth surface 414 and oriented in a fifth direction P5.

According to certain embodiments, the first surface 411 and/or the second surface 412 may be disposed to face the outside of the electronic device 101, for example, to face away from the inner space formed by the housing 310. According to an embodiment, the third surface 413 may be disposed adjacent to an edge of the housing 310. According to an embodiment, the fourth surface 414 and/or the fifth surface 415 may be disposed to face the inside of the electronic device 101, for example, to face the inner space formed by the housing 310. As another example, the first surface 411 and the fifth surface 415 may be arranged substantially parallel to each other.

According to certain embodiments, the first surface 411, the second surface 412, the third surface 413, the fourth surface 414, and the fifth surface 415 may be oriented in different directions, respectively, and the first surface 411 and/or the fifth surface 415 may be formed in curved faces so as to be oriented in different directions depending on the position thereon.

According to an embodiment, the second surface 412 and the fourth surface 414 may be formed as flat faces, and may include faces having different inclination angles relative to the third surface 413. For example, the second surface 412 may be formed to have a predetermined first inclination angle θ1 relative to the third surface 413, and the fourth surface 414 may be formed to have a predetermined second inclination angle θ2 relative to the third surface 413. The second surface 412 and the fourth surface 414 may extend from the opposite ends of the third surface 413, respectively, and may be oriented in different directions. As another example, the predetermined first inclination angle θ1 may be about 30 to 70 degrees from the extension line of one end of the third surface 413, and the predetermined second inclination angle θ2 of the fourth surface 414 may be about 30 to 70 degrees from the extension line of the other side of the surface 413.

According to certain embodiments, the decorative layer 430 may be disposed on one face of the first glass plate 410. According to an embodiment, the decorative layer 430 may be a print layer when the first glass plate 410 is the front plate. For example, the print layer may be prepared by directly coating opaque ink on the rear area of the first glass plate 410. According to an embodiment, the decorative layer 430 may be a film layer when the first glass plate 410 is the rear plate. For example, the film layer may be laminated to the first glass plate 410 via an adhesive material (e.g., OCA). The film layer may include a structure in which a UV molding layer (pattern formation), a vapor deposition layer, and a print layer are sequentially laminated toward the rear side on the basis of a transparent film (e.g., PET), and may be opaque as a whole via the print layer.

According to certain embodiments, the decorative layer 430 may be disposed from one side of the flat portion S1 of the first glass plate 410 to the fifth surface 415 of the curved portion S2. The decorative layer 430 disposed on the fifth surface 415 of the curved portion S2 may be disposed to be spaced apart from the end of the fourth surface 414 having the second inclination angle θ2. For example, the decorative layer 430 may be disposed so as not to cover a second area D2 between the fourth surface 414 and a first area D1 while being formed on the first area D1 of the fifth surface 415.

According to certain embodiments, the decorative layer 430 may include a first material that is different from the second material of the protective layer 450, and the first material may include acrylic ink.

According to certain embodiments, the protective layer 450 may be disposed on one face of the first glass plate 410. The protective layer 450 may be disposed to enclose at least a partial area of the second surface 412, the third surface 413, the fourth surface 414, and the fifth surface 415 of the curved portion S2. According to an embodiment, the protective layer 450 may be disposed to enclose at least a portion C of the decorative layer 430. For example, the protective layer 450 may be formed to cover the second area D2 of the fifth surface 415 and a part of the decorative layer 430. The protective layer 450 may be disposed to face the first area D1 of the fifth surface 415 with the decorative layer 430 interposed therebetween.

According to certain embodiments, the protective layer 450 may be coated on the entire area of the second surface 412, the third surface 413, and the fourth surface 414 from an end area of the fifth surface 415 of the curved portion S2, and may have a thickness greater than 0 and equal to or less than about 100 μm. According to an embodiment, the thickness A of the protective layer 450 coated on the third surface 413 may be approximately 10 to 50 μm. The protective layer 450 coated on the third surface 413 may be in an area substantially facing a bracket (e.g., the end of the bracket 440 in FIG. 7) with a gap therebetween, and may be a section in which the protective layer 450 hits the bracket 440. The first glass plate 410 may be protected from damage by an external impact thanks to the protective layer 450 coated on the third surface 413.

According to an embodiment, the protective layer 450 may be disposed to enclose the second surface 412 and the fourth surface 414. The second surface 412 is a terminal end of the protective layer 450, and the protective layer 450 formed on the second surface may be curved such that the protective layer 450 formed on the second surface 412 has a smooth finish face from the third surface 413, and may form a thickness D smaller than the thickness A of the protective layer 450 coated on the third surface 413. As another example, the fourth surface 414 is a section formed between the third surface 413 and the fifth surface 415 and may be formed as a curved face for smooth connection between the fourth surface 414 and the fifth surface 415, and a thickness smaller than the thickness A of the protective layer 450 coated on the third surface 413 may be formed.

According to an embodiment, the thickness of the protective layer 450 coated on the fifth surface 415 may be greater than 0 and equal to or less than about 100 μm. For example, the width B of the protective layer 450 coated on the fifth surface 415 may gradually increase toward the end of the first glass plate 410 and may be smoothly connected to the fourth surface 414. As another example, the width B of the protective layer 450 coated on the fifth surface 415 may be about 300 μm or less.

According to an embodiment, the protective layer 450 coated on the area from the second surface 412 to the fourth surface 414 may be coated on a chipping area to prevent glass breakage. The chipping area may be vulnerable to external impact due to micro-cracks generated on the surface of the processed surface during glass processing. For example, in the first glass plate 410, due to CNC machining, an edge area (e.g., the third surface 413) and chamfered areas (e.g., the fourth surface 414 and the second surface 215) may be abraded and damaged due to brittleness, which may lead to breakage of the first glass plate 410. In order to prevent this, the second surface 412, the third surface 413, and the fourth surface 414 of the first glass plate 410 may be covered with the protective layer 450 so as to prevent the chipping area from being damaged.

According to an embodiment, the protective layer 450 coated on the area from the second surface 412 to the fifth surface 415 may suppress the light leakage phenomenon. For example, the light generated from the display may cause light leakage at the end of the first glass plate 410 formed as a curved face (e.g., the second surface 412, the third surface 413, the fourth surface 414, and the fifth surface 415). The protective layer 450 formed on the curved portion S2, for example, the protective layer 450 covering the area from the second surface 214 to the fifth surface 415 is formed as a decorative layer and may prevent the light leakage phenomenon.

According to an embodiment, a partial area (e.g., the first area D1) of the protective layer 450 coated on the fifth surface 415 may cover a portion of the decorative layer 430 (e.g., a print layer). The end area of the decorative layer 430 and the end area of the protective layer 450 may overlap each other (e.g., in a section C) when viewing the first glass plate 410. The overlapping area may be about 280 μm or less. Thanks to the overlapping area, it is possible to prevent the decorative layer 430 from being damaged. For example, the print layer formed on one face of the first glass plate 410, which is formed as a curved face, may be difficult to print, and the end portion thereof may easily be torn off in a step following the print layer formation step. The protective layer 450 formed on the fifth surface 415 covers the terminal end of the decorative layer 430 and encloses the decorative layer 430 together with the first glass plate 410, so that it is possible to prevent the torn-off phenomenon of the decorative layer 430.

According to certain embodiments, the protective layer 450 may be formed to enclose the first glass plate 410 from the second surface 412 to the third surface 413, the fourth surface 414, and the fifth surface 415, and may be finished as a smoothly curved surface on the outside thereof. As another example, the protective layer 450 may be expanded to a partial area of the first surface 411 of the first glass plate 410 so as to be exposed to the outside of the electronic device 101.

According to certain embodiments, when the decorative layer 430 is provided as a print layer, the protective layer 450 may be made of an opaque material in order to cover the decorative layer 430. For example, the protective layer 450 may be formed of a material containing carbon. According to an embodiment, when the decorative layer 430 is provided as a film layer, the protective layer 450 may be made of a transparent or opaque material.

Referring to FIG. 8, the display 330 may be disposed as on one face of the first glass plate 410. The display 330 may have a plurality of layers 831, 832, 333 and 334 laminated in the inward direction of the electronic device. For example, a UV layer 831, a display panel 832, a light-shielding layer 333, a support layer 334, and a metal layer 335 are laminated in this order on the basis of one face of the first glass plate 410. However, in addition to the lamination sequence limited in this way, the lamination sequence may be changed in design in an efficient manner depending on buffering, shielding, and/or heat dissipation.

According to certain embodiments, the UV layer 831 of the display 330 may be adhered to one face of the first glass plate 410, and may be manufactured in a curved shape so as to face the curved portion S2 of the first glass plate 410.

According to certain embodiments, a partial area of the UV layer 831 may be disposed to cover at least a part of the decorative layer 430. On the fifth surface 415 of the first glass plate 410, the UV layer 831 and the protective layer 450 may be disposed to be spaced apart from each other. For example, the decorative layer 430 may extend from the first area D1 of the fifth surface 415 to the fourth area D4 and the third area D3. The UV layer 831 may be disposed so as not to cover the fourth area D4 between the protective layer 450 and the third area D3 while being formed on the third area D3 of the decorative layer 430.

According to certain embodiments, a light-shielding layer 333 may be provided as a layer shielding the rear face of the display panel 832. The light-shielding layer 333 may be, for example, a cushioning member, an embossing member or a copper (Cu) sheet, and may include black color. As another example, the support layer 334 may support the display 330, and the metal layer 335 may provide a heat dissipation function to block heat from a board or to prevent the heat from being transmitted to the display panel 832. For example, the metal layer 335 may include a graphite material.

Figure 9:
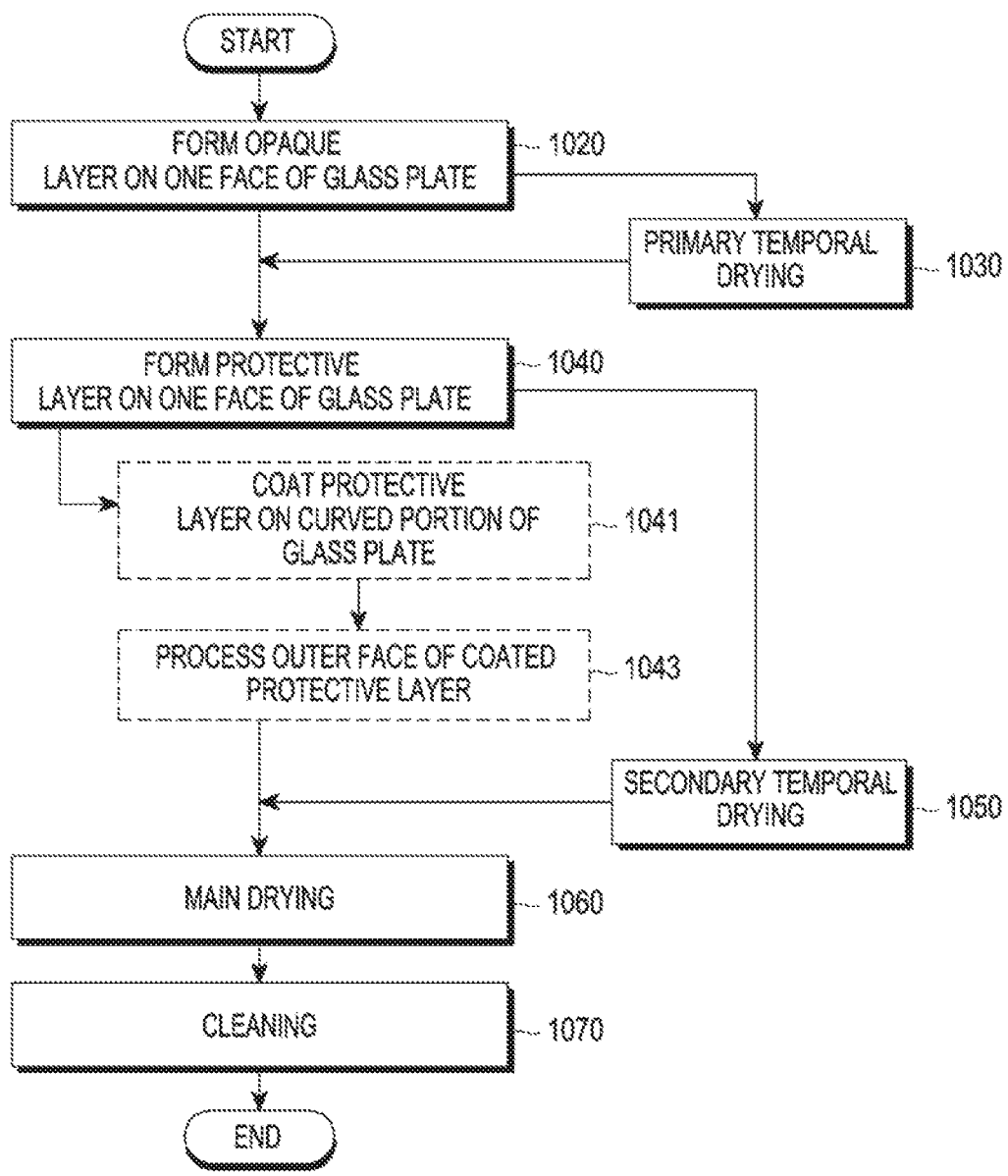
FIG. 9 is a flowchart illustrating the operation of forming a protective layer on a glass plate, according to certain embodiments.

FIG. 9 is a flowchart illustrating the operation of forming a protective layer on a glass plate, according to certain embodiments.

The configurations of a glass plate 410, a decorative layer 430, and a protective layer 450 manufactured in the electronic device manufacturing process of FIG. 9 may be the same as or similar to those of the first glass plate 410, the decorative layer 430, and the protective layer 450 in FIGS. 5 to 8.

According to certain embodiments, in step 1010, the decorative layer 430 may be formed on one face of the glass plate 410. According to an embodiment, the glass plate 410 may include a front plate (e.g., the front plate 320 in FIG. 4) oriented toward the front side of the electronic device (e.g., the electronic device 101 in FIGS. 1 to 4) or a rear plate (e.g., the rear plate 380 in FIG. 4) oriented toward the rear side of the electronic device 101. For example, when the glass plate 410 is the front plate 302, at least a part of the glass plate 410 may be substantially transparent and may contain various coating layers. As another example, when the glass plate 410 is the rear plate 380, it may be substantially opaque. At least a part of the glass plate 410 may include a curved surface (e.g., 2.5D or 3D).

According to an embodiment, the opposite side edges of the glass plate 410 have curved structures, which are seamlessly bent, and may include a flat portion (e.g., the flat portion S1 in FIG. 5A) and curved portions S2 extending from the edges of the flat portion S1. The curved portions S2 are formed along the longitudinal direction of the glass plate 410 and may be disposed at the opposite side edges of the glass plate 410.

According to an embodiment, the curved portion S2 of the glass plate 410 may include a first surface 411 oriented in a first direction P1, a second surface 411 extending from the first surface 411 and oriented in a second direction P2, a third surface 413 extending from the second surface 412 and oriented in a third direction P3, a fourth surface 414 extending from the third surface 413 and oriented in a fourth direction P4, and a fifth surface 414 extending from the fourth surface 414 and oriented in a fifth direction P5.

According to an embodiment, the first surface 411 and/or the second surface 412 may be oriented toward the outside of the electronic device. The third surface 413 may be disposed adjacent to an edge of the housing (e.g., the bracket 440). The fourth surface 414 and/or the fifth surface 415 may be oriented toward the inside of the electronic device 101. As another example, the first surface 411 and the fifth surface 415 may be arranged substantially parallel to each other.

According to certain embodiments, the decorative layer 430 may be disposed in a partial area of the flat face portion S1 of the glass plate 410 and the fifth surface 415 of the curved portion S2. The decorative layer 430 disposed on the fifth surface 415 of the curved portion S2 may be disposed to be spaced apart from the end of the fourth surface 414. For example, the decorative layer 430 may be disposed so as not to cover a second area D2 between the fourth surface 414 and a first area D1 while being formed on the first area D1 of the fifth surface 415.

According to an embodiment, when the glass plate 410 is the front plate 320, the decorative layer 430 may be a print layer. For example, the decorative layer may be a material including a polyester-based polymer resin or an acrylic ink. The decorative layer may provide various colors to a partial area (e.g., a bezel area) of the transparent first glass plate 410.

According to an embodiment, when the glass plate 410 is the rear plate 380, the decorative layer 430 may be a film layer. The film layer may be laminated to the glass plate 410.

According to an embodiment, the step of disposing the decorative layer on the glass plate 410 and the step of disposing the film layer on the glass plate 410 may be performed sequentially, or may be performed selectively or simultaneously.

According to certain embodiments, after forming the decorative layer 430 on the glass plate 410 according to step 1030, primary temporal drying may be performed. The primary temporal drying may be performed in order to increase the adhesion between the glass plate 410 and the decorative layer 430. The primary temporal drying may be selectively performed after disposing the decorative layer 430 on the glass plate 410.

According to certain embodiments, after disposing the decorative layer 430 on one face of the glass plate 410 according to step 1040, or after the primary temporal drying, the protective layer 450 may be formed on one face of the glass plate 410.

According to an embodiment, the protective layer 450 may be disposed to enclose at least a partial area of the second surface 412, the third surface 413, the fourth surface 414, and the fifth surface 415 of the curved portion S2. According to an embodiment, the protective layer 450 may be disposed to enclose at least a part of the decorative layer 430. For example, the protective layer 450 may be formed to cover the second area D2 of the fifth surface 415 and a part of the decorative layer 430. The protective layer 450 may be disposed to face the first area D1 of the fifth surface 415 with the decorative layer 430 interposed therebetween.

According to an embodiment, the protective layer 450 may be coated on the entire area of the second surface 412, the third surface 413, and the fourth surface 414 from an end area of the fifth surface 415 of the curved portion S2, and may have a thickness greater than 0 and equal to or less than about 100 μm.

According to an embodiment, the protective layer 450 may be disposed to enclose the second surface 412 and the fourth surface 414. The second surface 412 is a terminal end of the protective layer 450, and the protective layer 450 formed on the second surface 412 may be curved such that the protective layer 450 formed on the second surface 412 has a smooth finish face from the third surface 413, and may form a thickness D smaller than the thickness A of the protective layer 450 coated on the third surface 413. As another example, the fourth surface 414 is a section formed between the third surface 413 and the fifth surface 415 and may be formed as a curved face for smooth connection between the fourth surface 414 and the fifth surface 415, and a thickness smaller than the thickness A of the protective layer 450 coated on the third surface 413 may be formed.

According to certain embodiments, after forming the decorative layer 430 on one face of the glass plate 410 according to step 1050, secondary temporal drying may be performed. The secondary temporal drying may be performed in order to increase the adhesion between the glass plate 410 and the protective layer 450. The secondary temporal drying may be selectively performed after disposing the protective layer 450.

According to certain embodiments, after disposing the protective layer 450 on the glass plate 410 according to step 1060, or after the secondary temporal drying, main drying may be performed. The main drying may reduce a defect rate caused by the penetration or flow of foreign matter through the complete drying of the glass plate 410, the decorative layer 430, and the protective layer 450.

According to certain embodiments, the glass plate 410 and the protective layer 450 may be cleaned after the main drying, according to step 1070. Cleaning removes foreign matter cured due to deposition and drying.

Figure 10:
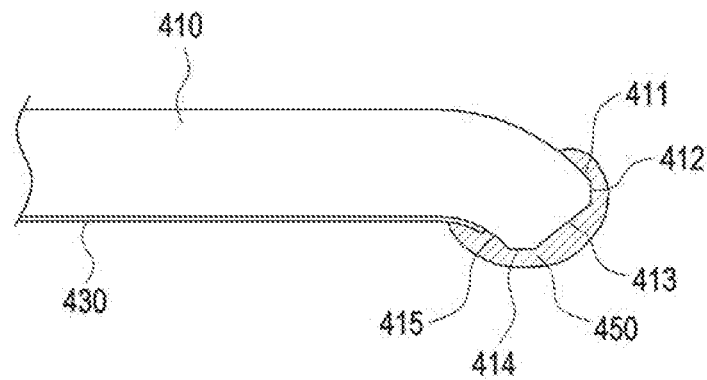
FIG. 10 is a cross-sectional view illustrating a glass plate on which a protective layer is disposed, according to certain embodiments.

FIG. 10 is a cross-sectional view illustrating a glass plate on which a protective layer is disposed, according to certain embodiments.

The electronic device manufacturing method of FIG. 9 may be applied to the glass plate of FIG. 10. The configurations of a glass plate 410, a decorative layer 430, and a protective layer 450 illustrated in FIG. 10 may be the same as or similar to those of the first glass plate 410, the decorative layer 430, and the protective layer 450 in FIGS. 5 to 8.

Referring to FIGS. 9 and 10, according to step 1040, after disposing the decorative layer 430 on one face of the first glass plate 410 (step 1020), or after the primary temporal drying (step 1030), the protective layer 450 may be formed on one face of the glass plate 410.

According to an embodiment, according to step 1041 and FIG. 10, the protective layer 450 may be coated on the curved portion S2 of the glass plate 410. The protective layer 450 may be coated on at least a partial area of the first surface 411, the second surface 412, the third surface 413, the fourth surface 414, and at least a partial area of the fifth surface 415 of the curved portion S2 using a coating solution formed of at least one of acrylic melamine, modified acrylic, and modified epoxy. The protective layer 450 may be a coating liquid having any of various colors rather than being transparent. A partial area of the protective layer 450 may be coated with a large amount of coating liquid according to an operator's intention. For example, the protective layer 450 may be coated by intentional overflow over the first surface 411, by which the surface of the glass plate can be protected from an external impact. As another example, the protective layer 450 may provide an aesthetically pleasing design through intentional overflow over the first surface 411 and through various colored coating processes.

Figure 11A:
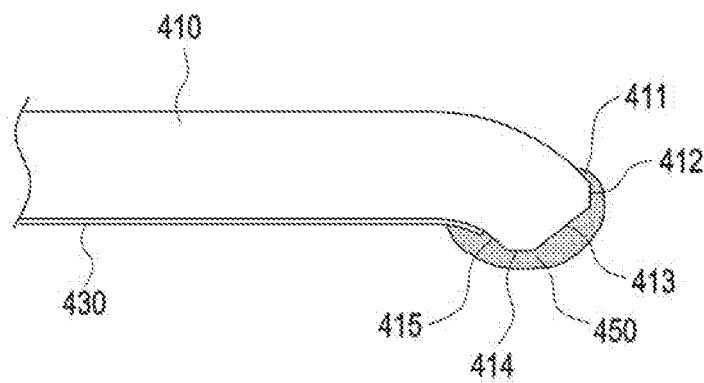
FIG. 11A and FIG. 11B are views illustrating sequence of steps for disposing a protective layer on one side of a glass plate, in accordance with certain embodiments.
Figure 11B:
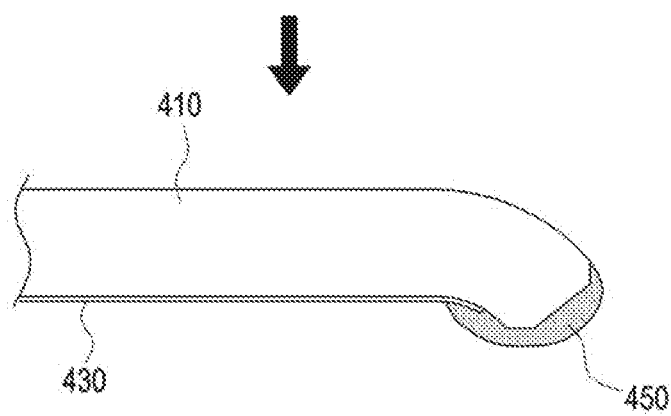

FIGS. 11A and 11B are views illustrating another sequence of steps for disposing a protective layer on one face of a glass plate according to certain embodiments.

The electronic device manufacturing method of FIG. 9 may be applied to the glass plate of FIGS. 11A and 11B. The configurations of a glass plate 410, a decorative layer 430, and a protective layer 450 illustrated in FIGS. 11A and 11B may be the same as or similar to those of the glass plate 410, the decorative layer 430, and the protective layer 450 in FIGS. 5 to 8.

According to an embodiment, according to step 1041 and FIG. 11A, the protective layer 450 may be coated on the curved portion S2 of the glass plate 410. The protective layer 450 may be coated on at least a partial area of the first surface 411, the second surface 412, the third surface 413, the fourth surface 414, and at least a partial area of the fifth surface 415 of the curved portion S2 using a coating solution formed of at least one of acrylic melamine, modified acrylic, and modified epoxy.

After the protective layer 450 is coated on the curved portion S2 of the glass plate 410 (step 1041), the step of processing the outer surface of the coated protective layer 450 may be performed according to step 1043 and FIG. 12B. The processing step may be the step of processing the first surface 411 area oriented toward the front side of the glass plate 410 such that the protective layer 450 is not covered on the first surface 411 area. For example, since the protective layer 450 may be manufactured in the state in which the protective layer 450 exists on the first surface 411 of the glass plate 410 through step 1041, the protective layer 450 may be removed through polishing, laser processing, or the like so as not to be disposed on the first face 411. According to an embodiment, when viewing the front face of the electronic device from the outside, by removing the protective layer 450 protruding toward the front face of the glass plate 410, it is possible to implement aesthetic continuity (e.g., a sense of unity in design) between the glass plate 410 and the housing.

An electronic device (e.g., the electronic device 101 of FIGS. 1 to 4) according to certain embodiments may include a housing (e.g., the housing 310 in FIGS. 2 and 3), a first glass plate (e.g., the first glass plate 410 in FIG. 7) attached to the housing to define an inner space together with the housing, a decorative layer (e.g., the decorative layer 430 in FIG. 7) and a protective layer (e.g., the protective layer 450 in FIG. 7) The first glass plate may include a peripheral portion adjacent to the housing, and the peripheral portion may include a first surface 411 oriented in a first direction (e.g., the first direction P1 in FIG. 7 or downwards) away from the inner space, a second surface (e.g., the second surface 412 in FIG. 7) extending from the first surface and oriented in a second direction (e.g., the second direction P2 in FIG. 7 or downwards to the right) away from the inner space, a third surface (e.g., the third surface 413 in FIG. 7) extending from the second surface and located adjacent to the periphery of the housing in a third direction (e.g., the third direction P3 in FIG. 7 or rightwards), a fourth surface (e.g., the fourth surface 414 in FIG. 7) extending from the third surface and oriented in a fourth direction (e.g., the fourth direction P4 in FIG. 7 or rightwards and upwards) toward the inner space, and a fifth surface (e.g., the fifth surface 415 in FIG. 7) extending from the fourth surface substantially parallel to the first surface and oriented in a fifth direction (e.g., the fifth direction P5 in FIG. 7 or upwards) toward the inner space. The decorative layer (e.g., the decorative layer 430 in FIG. 7) may be formed on a first area (e.g., the first area D1 in FIG. 7) of the fifth surface so as not to cover a second area (e.g., the second area D2 in FIG. 7) between the fourth surface and the first area, and the decorative layer may include a first material. The protective layer (e.g., the protective layer 450 in FIG. 7) may be formed to cover the second surface, the third surface, the fourth surface, a curved portion of the fifth surface, and a part of the decorative layer, and the protective layer may include a second material.

According to certain embodiments, the first glass plate may include a flat portion (e.g., the flat portion S1 in FIG. 5A) and a curved portion (e.g., the curved portion S2 in FIG. 5A) extending from an edge of the flat portion, and the peripheral portion may be a part of the curved portion.

According to certain embodiments, the electronic device may further include a display (the display 330 in FIG. 6) disposed in the inner space and visually exposed to the outside through the first glass plate.

According to certain embodiments, the electronic device may further include a second glass plate (e.g., the front plate 320 in FIG. 4) facing away from the first glass plate (e.g., the rear plate 380 in FIG. 4), and a display disposed in the inner space and visually exposed to the outside through the second glass plate.

According to certain embodiments, the first material may include acrylic ink.

According to certain embodiments, the second material may include at least one of acrylic melamine, modified acrylic, and modified epoxy.

According to certain embodiments, each of the first surface and the fifth surface of the first glass plate may include an area formed as a curved face, and the third surface may be formed as a flat face.

According to certain embodiments, the second surface of the first glass plate is formed to have a first predetermined inclination angle (e.g., the first inclination angle θ1 in FIG. 7) relative to the third surface, and the fourth surface of the first glass plate has a second predetermined inclination angle (e.g., the second inclination angle θ2 in FIG. 7) relative to the third surface.

According to certain embodiments, at least a part of a thickness formed in the third direction in the protective layer that covers the third surface may be formed to be larger than a thickness formed in the fifth direction in the protective layer that covers the fifth surface.

According to certain embodiments, the third surface of the first glass plate may be disposed to face a partial area of the housing in a state of being spaced apart from the partial area, and the protective layer that covers the third surface may prevent the partial area of the housing and the third surface from coming into contact with each other.

According to certain embodiments, the protective layer disposed to cover the first glass plate from the fifth surface to the second surface may prevent light emitted from the display from leaking out via an inside of the first glass plate and through any one of the second surface, the third surface, the fourth surface, and the fifth surface of the peripheral portion.

According to certain embodiments, the display may include a UV layer (e.g., the UV layer 831 in FIG. 8) formed to cover a part of the decorative layer, and the UV layer may be formed on a third area (e.g., the first area D3 in FIG. 8) of the fifth surface so as not to cover a fourth area (e.g., the fourth area D4 in FIG. 8) between the protective layer and the third area.

According to certain embodiments, the protective layer may include a first protective layer (e.g., the first protective layer 450a in FIGS. 5A and 5B) and a second protective layer (e.g., the second protective layer 450b in FIGS. 5A and 5B), the first protective layer may be coated along a first longitudinal edge of the first glass plate, and the second protective layer may be coated along a second longitudinal edge of the first glass plate.

According to certain embodiments, the protective layer may include a third protective layer (e.g., the third protective layer 450c in FIG. 5B) and a fourth protective layer (e.g., the fourth protective layer 450d in FIG. 5B), and the third protective layer may extend from the first protective layer, may be connected to the second protective layer, and may be coated along a second widthwise edge of the first glass plate. The fourth protective layer may extend from the second protective layer, may be connected to the first protective layer, and may be coated along a second widthwise edge of the first glass plate.

According to certain embodiments, the protective layer may be formed to cover at least a part of the first surface extending from the second surface.

An electronic device (e.g., the electronic device 101 of FIGS. 1 to 4) according to certain embodiments may include a housing, a first glass plate attached to the housing to define an inner space together with the housing, a decorative layer, and a protective layer. The first glass plate may include a peripheral portion adjacent to the housing, and the peripheral portion may include a first surface oriented in a first direction away from the inner space, a second surface extending from the first surface and oriented in a second direction away from the inner space, a third surface extending from the second surface and located adjacent to the periphery of the housing in a third direction, a fourth surface extending from the third surface and oriented in a fourth direction toward the inner space, and a fifth surface extending from the fourth surface substantially parallel to the first surface and oriented in a fifth direction toward the inner space. The decorative layer may be formed on a first area of the fifth surface so as not to cover a second area between the fourth surface and the first area, and may include a first material. The protective layer may be formed to cover the second surface, the third surface, the fourth surface, a curved portion of the fifth surface, and a part of the decorative layer, and may include a second material.

An electronic device (e.g., the electronic device 101 in FIGS. 1 to 4) according to certain embodiments may include: a first glass plate including a flat portion and a curved portion extending from an edge of the flat portion, such that the curved portion includes, a first surface oriented in a first direction toward an outside of the electronic device, a second surface extending from the first surface and oriented in a second direction, a third surface extending from the second surface and oriented in a third direction, the third surface forming a part of a side face of a housing, a fourth surface extending from the third surface and oriented in a fourth direction toward an inside of the electronic device, and a fifth surface extending from the fourth surface substantially parallel to the first surface and oriented in a fifth direction; a decorative layer disposed on at least a partial area of the fifth surface of the curved portion from the flat portion of the first glass plate; and a protective layer continuously formed along the second surface, the third surface, the fourth surface, and the fifth surface of the curved portion, and disposed to be laminated on a part of the decorative layer.

According to certain embodiments, the first, the second, the third, the fourth, and the fifth directions of the first glass plate may be different from each other, the protective layer may cover a first area of the fifth surface and a second area extending from the first area and forming an end of the fifth surface, and the decorative layer may be disposed in the first area of the fifth surface.

According to certain embodiments, the curved portion may be formed along each of opposite longitudinal edges of the first glass plate.

According to certain embodiments, the second surface of the first glass plate may be formed to have a first predetermined inclination angle relative to the third surface, and the fourth surface of the first glass plate may be formed to have a second predetermined inclination angle relative to the third surface.

As will be apparent to a person ordinarily skilled in the technical field to which the disclosure belongs, the above-mentioned electronic device according to certain embodiments is not limited by the above-mentioned embodiment and drawings, and may be variously substituted, modified, and changed within the technical scope of the disclosure.

What is claimed is:

1. An electronic device comprising:
   a housing;
   a first glass plate coupled to the housing and defining an inner space between the first glass plate and the housing, the first glass plate including a peripheral portion disposed adjacent to the housing, wherein the peripheral portion includes:
   a first surface oriented in a first direction away from the inner space;
   a second surface extending from an end of the first surface and oriented in a second direction away from the inner space;
   a third surface extending from an end of the second surface and disposed adjacent to a periphery of the housing in a third direction;
   a fourth surface extending from an end of the third surface and disposed adjacent to a periphery of the housing in a fourth direction; and
   a fifth surface extending from the fourth surface, substantially parallel to the first surface and oriented in a fifth direction toward the inner space;
   a decorative layer formed of a first material, disposed on a first area of the fifth surface such that a second area disposed between the fourth surface and the first area is uncovered by the decorative layer; and
   a protective layer formed of a second material, covering the second surface, the third surface, the fourth surface, a curved portion of the fifth surface, and a part of the decorative layer.
2. The electronic device of claim 1, wherein the first glass plate includes a flat portion and a curved portion extending from an edge of the flat portion, and the peripheral portion is a part of the curved portion.
3. The electronic device of claim 2, wherein the first surface and the fifth surface each include an area having a curvature, and
   wherein the third surface is flat.
4. The electronic device of claim 2,
   wherein the second surface is formed to include a predetermined first inclination angle relative to the third surface, and
   the fourth surface is formed to include a predetermined second inclination angle relative to the third surface.
5. The electronic device of claim 2,
   at least a part of a thickness formed in the third direction in the protective layer that covers the third surface is larger than a thickness formed in the fifth direction in the protective layer that covers the fifth surface.
6. The electronic device of claim 1, further comprising:
   a display at least partially disposed within the inner space and visually exposed to an exterior of the electronic device through the first glass plate.
7. The electronic device of claim 6, wherein the third surface of the first glass plate is disposed to face a partial area of the housing in a state of being spaced apart from the partial area, and
   the protective layer that covers the third surface prevents the partial area of the housing and the third surface from coming into contact with each other.
8. The electronic device of claim 6, wherein the protective layer disposed to cover the first glass plate from the fifth surface to the second surface prevents light emitted from the display from leaking out via an inside of the first glass plate and through any one of the second surface, the third surface, the fourth surface, or the fifth surface of the peripheral portion.
9. The electronic device of claim 6, wherein the display includes a UV layer covering a part of the decorative layer, and
   wherein the UV layer is disposed on a third area of the fifth surface so as not to cover a fourth area disposed between the protective layer and the third area.
10. The electronic device of claim 1, further comprising:
    a second glass plate facing away from the first glass plate; and
    a display disposed within the inner space and visually exposed to an exterior of the electronic device through the second glass plate.
11. The electronic device of claim 1, wherein the first material includes acrylic ink.
12. The electronic device of claim 1, wherein the second material includes at least one of acrylic melamine, modified acrylic, or modified epoxy.
13. The electronic device of claim 1, wherein the protective layer includes a first protective layer and a second protective layer,
    wherein the first protective layer is disposed along a first longitudinal edge of the first glass plate, and
    wherein the second protective layer is disposed along a second longitudinal edge of the first glass plate.
14. The electronic device of claim 13, wherein the protective layer includes a third protective layer and a fourth protective layer,
    wherein the third protective layer extends from the first protective layer, is coupled to the second protective layer, and is coated along a first widthwise edge of the first glass plate, and
    wherein the fourth protective layer extends from the second protective layer, is coupled toe the first protective layer, and is coated along a second widthwise edge of the first glass plate.
15. The electronic device of claim 1, wherein the protective layer covers at least a part of the first surface from which the second surface extends.

16. An electronic device, comprising:
a housing;
a first glass plate coupled to the housing as to define an inner space between the first glass plate and the housing, the first glass plate including a peripheral portion disposed adjacent to the housing, wherein the peripheral portion includes:
 a first surface facing away from the inner space;
 a second surface extending from an end of the first surface and set at a first angle relative to a plane of the first surface;
 a third surface extending from an end of the second surface and set at a second angle relative to a plane of the second surface;
 a fourth surface extending from an end of the third surface and set at a third angle relative to a plane of the third surface; and
 a fifth surface extending from the fourth surface substantially parallel to the first surface and facing the inner space, the fifth surface including a curvature;
a decorative layer disposed on a first area of the fifth surface such that a second area disposed between the fourth surface and the first area is uncovered by the decorative layer; and
a protective layer covering the second surface, the third surface, the fourth surface, a second area of the fifth surface, and a part of the decorative layer.

17. An electronic device comprising:
a first glass plate including a flat portion and a curved portion forming an end of the first glass plate, wherein the curved portion include:
 a first surface oriented in a first direction toward an exterior of the electronic device;
 a second surface extending from an end of the first surface and oriented in a second direction;
 a third surface extending from an end of the second surface and oriented in a third direction, the third surface forming a part of a side face of the electronic device;
 a fourth surface extending from an end of the third surface and oriented in a fourth direction toward an inside of the electronic device; and
 a fifth surface extending from an end of the fourth surface, substantially parallel to the first surface and oriented in a fifth direction;
a decorative layer disposed on at least a partial area of the fifth surface included in the curved portion of the first glass plate; and
a protective layer covering the second surface, the third surface, the fourth surface, and the fifth surface of the first glass plate, and further laminated over a part of the decorative layer.

18. The electronic device of claim 17, wherein the first surface, the second surface, the third surface, the fourth surface, and the fifth surface all face different directions,
 wherein the fifth surface includes a first area and a second area extending from the first area, and the second area forms an end of the fifth surface,
 wherein the protective layer covers the first area and the second area of the fifth surface, and
 wherein the decorative layer covers the first area of the fifth surface.

19. The electronic device of claim 18, wherein the first glass plate includes two curved portions, and each curved portion is formed along longitudinal edges of the first glass plate.

20. The electronic device of claim 18, wherein the second surface of the first glass plate is formed to have a first predetermined inclination angle relative to the third surface, and the fourth surface of the first glass plate is formed to have a second predetermined inclination angle relative to the third surface.

* * * * *